Sept. 29, 1953  F. L. EASTMAN  2,653,775
FILM-RETAINING DEVICE FOR REELS
Filed Feb. 12, 1952
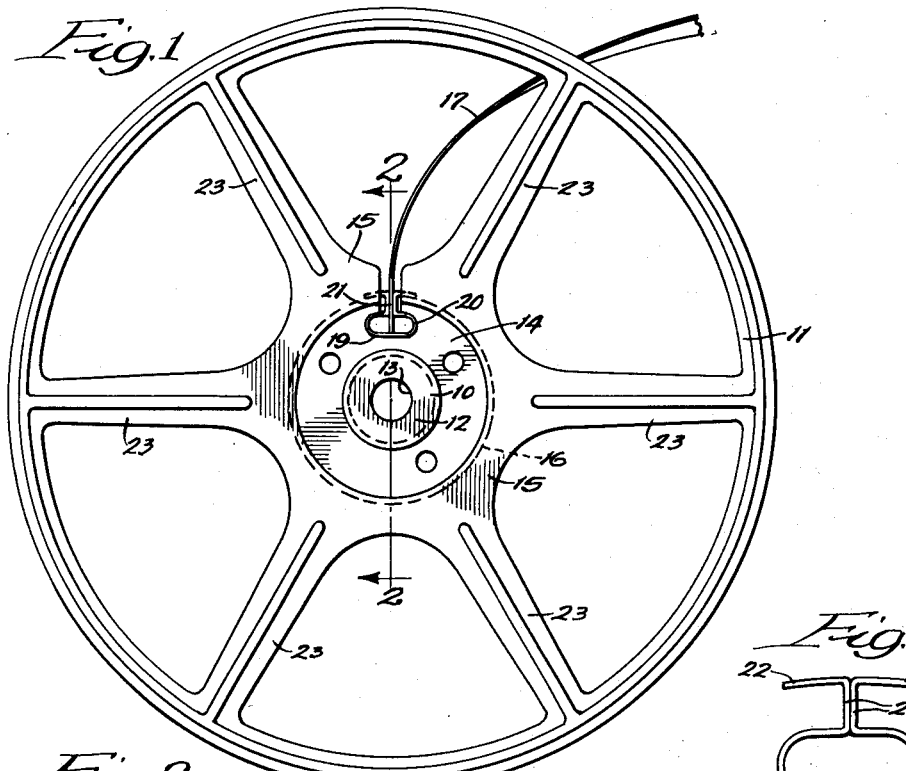
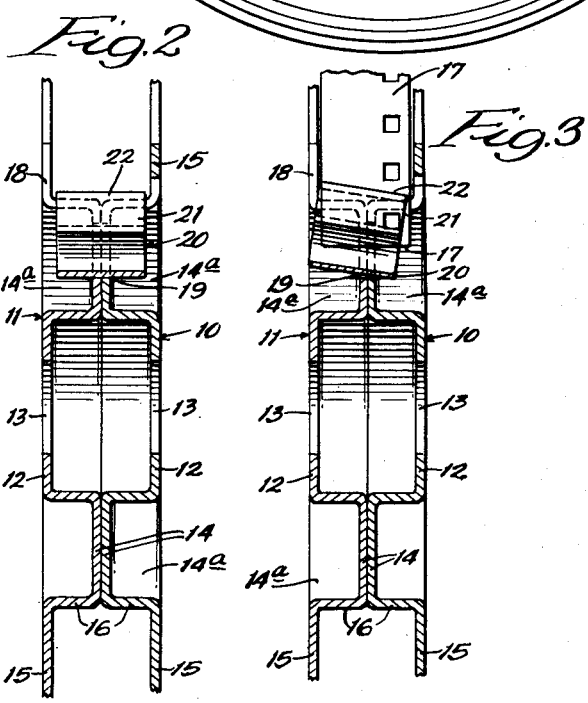
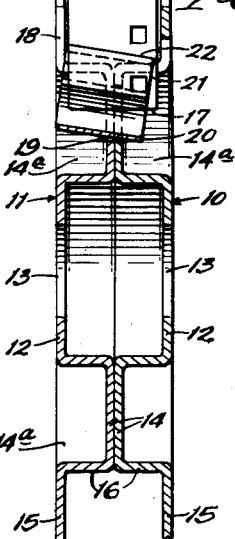
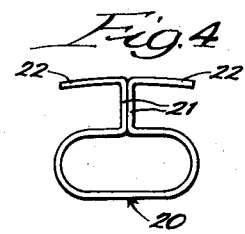
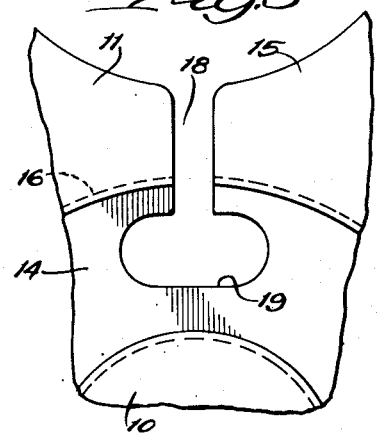
INVENTOR:
Fred L. Eastman,
BY
Dawson & Ooms,
ATTORNEYS.

Patented Sept. 29, 1953

2,653,775

UNITED STATES PATENT OFFICE 2,653,775

FILM-RETAINING DEVICE FOR REELS

Fred L. Eastman, Chicago, Ill., assignor to Compco Corporation, Chicago, Ill., a corporation of Illinois Application February 12, 1952, Serial No. 271,252

2 Claims. (Cl. 242—74)

This invention relates to a film-retaining device for motion picture film reels and similar reels. The invention is particularly useful for the attachment of the end of a film to the reel. The film may be motion picture film, recording tape, or any other type of film. The present application is a continuation-in-part of my copending application, Serial No. 768,950, filed August 16, 1947, now abandoned for Film-Retaining Device for Reels.

In the application of film to a reel in a motion picture machine, etc., considerable difficulty is experienced in securing the end of the film to the hub or core portion of the reel. Slots are provided, but the stiffness of the film and its springy character cause it to easily slip out of the slot during the initial winding of the film. Further, an improper attachment of the inner end of the film militates against the uniform winding of the film about the reel hub.

An object of the present invention is to provide simple means carried by the reel for receiving the tip end portion of the film and locking it securely in position for the winding of the film upon the reel. A further object is to provide a spring holder or retainer for the end of the film in combination with a reel structure having a slot permitting the lateral movement of the film into secured position. Yet another object is to provide an improved reel structure equipped with non-projecting means for locking the end of the film securely in position upon the reel. Other specific objects and advantages will appear as the specification proceeds.

The invention is illustrated in a preferred embodiment by the accompanying drawing, in which—

Figure 1 is a side view in elevation of a reel structure embodying my invention; Fig. 2, a transverse sectional view, the section being taken as indicated at line 2, Fig. 1; Fig. 3, a view similar to Fig. 2, but showing the spring holder or retainer in tilted position within the drum or film-receiving hub; Fig. 4, a side view in elevation of the spring-grip device; and Fig. 5, an enlarged broken side view of a portion of the reel showing the lateral slot therein.

In the illustration given, a reel structure is shown formed from the discs or plates 10 and 11. The plates 10 and 11 are provided with central hub portions 12 apertured at 13. The plates 10 and 11 then come together to form central web portions 14, as indicated best in Fig. 2. The plates 10 and 11 then diverge to form film-engaging side discs 15. The lateral-extending portions 16 form a drum or hub portion for receiving the film 17.

In the illustration given, the side wall 15 of the plate 11 is cut away to provide a slot 18, as shown more clearly in Fig. 5. The web portions 14 of both plates are cut away to provide the slot 19 as shown more clearly in Fig. 4.

A spring member 20 of the configuration illustrated in Fig. 3 as a U-shaped body portion is received within the slot 19 and has upwardly-extending end portions 21 abutting each other. The portions 21 are turned laterally, as shown in Fig. 3, to form locking arms 22.

The spring 20 may be formed of any suitable resilient material. A phosphor-bronze spring is found to be highly satisfactory because the spring retains its resiliency indefinitely.

In assembling the spring 20, the body portion is received within the main slot 19 of the web portion 14 of the plates and the spring portions 21 extend upwardly part way through the slot 18. The ends 22 are turned laterally, as shown in Fig. 1, so as to lie flat against the portions 16 of the reel. The arms 22 thus extend laterally of the slot 18 and thus lock the spring 20 securely in position.

Operation

In the operation of the reel, the end of the film 17 is passed between the disc walls 15 and then laterally through the side opening 23 of the plate 11. The end of the film is then grasped by the fingers and pressed laterally through the slots 18 and 19 and between the spring arms 21. The operation is a brief one and because the film can be fed laterally between the spring arms 21, it is easy for the locking operation to be accomplished. For removing the film end, a simple pull upon the film causes it to leave the spring fingers and to be thus released. If desired, it may be pressed laterally through the openings 18 and 19.

The tension of the spring may be modified as desired to give the necessary gripping force while permitting ready withdrawal or release of the film.

The large opening 23 enables the film 17 to be drawn therethrough in any position or angle and then the entire operation of securing the film in position is carried on outside of the reel itself. This permits the fingers to grasp the film end very easily and the operation of pressing it laterally between the spring arms 21 is accomplished with ease. Further, the slot 18 is highly useful in the removal of the end of the film because it permits the film to be swung laterally for quick disengagement with the gripping fingers 21.

The floating spring clamp 20 is suspended by the arms 22 upon the hub 16 and may be moved laterally or tilted within the hub, as illustrated in Figs. 2 and 3. Both sides of the spring are exposed within the recesses 14a between the hubs 12 and 16, as shown more clearly in Figs. 2 and 3, so that the fingers of the operator may engage the opposite sides of the spring clamp 20 to straighten the film therein and to center the same within the hub 16. The straightening of the film within the spring requires a minimum of time and little effort or care, because even if the film is not perfectly aligned with the spring, the spring itself moves laterally to a centering position for the film within the film-receiving hub 16.

In the film-securing operation, whether the film be drawn laterally of the spring and pressed through the spring from the side or whether the film be threaded downwardly through the spring along an edge thereof and then pressed laterally within the spring clamp 20, the exposed open sides of the spring 20 within the open recesses 14a enable the operator to quickly align the film within the spring by engaging opposite sides of the spring between the thumb and forefinger and straighten the spring with respect to the tape. Should the tape extend diagonally with respect to the spring, as illustrated in Fig. 2, the grasping of the opposite sides of the spring between the thumb and forefinger quickly aligns the film tape with the spring, and should the alignment not be perfect, the floating spring itself, under the action of the film, quickly centers the spring and film within the film-receiving hub 16. The elongated or elliptical opening provided by the lower portion of spring 20 permits the fingers or finger portions to engage the tape for aligning the same, and the exposed opposite sides of the spring within the open areas 14a permit spring and film tape alignment in a moment of time. At the same time, the narrow central webs 14, which are slotted to receive the floating spring 20, freely receive the spring structure, and the shoulders of the spring are prevented from moving upwardly by engagement with the undersides of the hub shoulders 16.

While the spring 20 is thus rendered readily accessible for alignment with the film tape, it is at the same time sheltered against deformation or injury by the inner and outer hubs, namely, the outer hub 16 and the inner hub 12.

While in the foregoing specification, I have set forth one specific structure for the purpose of illustrating one modification of the invention, it will be understood that the details of such structure may be varied widely by those skilled in the art without departing from the spirit of my invention.

I claim:
1. In a reel structure, a frame providing a hub and spaced discs extending outwardly from said hub, said discs having large openings therein and said frame within said hub being recessed to provide open areas below the hub, said frame below said hub providing an enlarged spring-receiving slot and said hub having a transverse slot therein communicating with said spring slot, at least one of said discs having a slot providing communication between one of said large openings of a disc and said hub and spring slots, a spring device supported by said hub and providing a pair of spring fingers within the transverse slot of said hub, said fingers presenting contacting gripping surfaces therebetween extending at right angles to said last-mentioned slot which connects said hub slot to one of said large openings of the disc, whereby said spring fingers are exposed throughout their length by said last-mentioned slot, permitting a film end to be drawn through said slots and between the spring fingers of said spring and then laterally shifted to center the film within said spring.

2. In a reel structure, a pair of discs united centrally to provide an annular film-receiving hub and discs extending outwardly therefrom, said hub having a slot extending transversely thereof and said discs within said hub being recessed to provide an enlarged space therein communicating with said hub slot and providing also an annular recess on the inner side of the hub, at least one of said discs being provided with a large opening and with a vertical slot establishing communication between said large opening and said hub slot, and a floating spring having diverging arms carried by said hub and presenting contacting clamping surfaces extending through the slot of said hub, the lower portion of the spring being in the form of an elongated loop received within the recessed space of said discs, said spring having a width less than the space between said discs about said hub, whereby said spring is laterally movable upon said hub for centering the end of a film gripped by said spring within the space between said discs.

FRED L. EASTMAN.

References Cited in the file of this patent

UNITED STATES PATENTS

| Number | Name | Date |
| --- | --- | --- |
| 1,009,673 | Lang | Nov. 21, 1911 |
| 1,118,689 | Sharlow | Nov. 24, 1914 |
| 2,051,334 | Goldberg | Aug. 18, 1936 |
| 2,189,547 | Fischer | Feb. 6, 1940 |

FOREIGN PATENTS

| Number | Country | Date |
| --- | --- | --- |
| 476,785 | Great Britain | Dec. 15, 1937 |
| 96,038 | Sweden | June 20, 1939 |
| 503,960 | Great Britain | Apr. 18, 1939 |